(12) United States Patent
Stultz

(10) Patent No.: US 10,992,122 B2
(45) Date of Patent: Apr. 27, 2021

(54) CONFIGURABLE PRESSURE BULKHEAD FEEDTHROUGH

(71) Applicant: Raytheon Company, Waltham, MA (US)

(72) Inventor: Jeffrey S. Stultz, Carmel, IN (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/391,831

(22) Filed: Apr. 23, 2019

(65) Prior Publication Data

US 2020/0343706 A1    Oct. 29, 2020

(51) Int. Cl.
*H02G 3/22*    (2006.01)
*B60R 16/02*    (2006.01)
*B63B 17/00*    (2006.01)

(52) U.S. Cl.
CPC .......... *H02G 3/22* (2013.01); *B60R 16/0207* (2013.01); *B63B 17/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,952,695 A * | 3/1934 | Webb | ................... | H01B 17/308 174/151 |
| 2,369,413 A * | 2/1945 | Rusz | ...................... | F16G 11/08 403/221 |
| 2,431,154 A * | 11/1947 | Wikstrom | ............ | H02G 3/0658 285/149.1 |
| 2,517,717 A * | 8/1950 | Rose | ........................ | F16L 5/14 285/192 |
| 2,719,736 A * | 10/1955 | Swanson | ................... | F16L 7/02 285/149.1 |
| 2,842,385 A * | 7/1958 | Webster | .................. | F16L 23/10 285/408 |
| 2,881,241 A * | 4/1959 | Stecher | ................ | H02G 15/013 174/77 R |
| 2,936,187 A * | 5/1960 | Peterson | .............. | H01B 17/308 277/516 |
| 3,056,852 A * | 10/1962 | Sachs | ................... | H02G 3/0658 174/153 G |
| 3,149,198 A * | 9/1964 | Kitselman | ................ | H02G 3/16 174/542 |
| 3,170,748 A * | 2/1965 | Van Horssen | ......... | H01R 24/40 439/333 |
| 3,174,777 A * | 3/1965 | Evans | ..................... | F16L 33/02 285/252 |

(Continued)

OTHER PUBLICATIONS

"Firewall Grommet With Retainer 1956-1971 CJ5, CJ6, Truck, Wagon, Delivery," Walck's 4 Wheel Drive, https://walcks4wd.com/Firewall-Grommet-With-Retainer-1956-1971-CJ5-CJ6-Truck-Wagon-Delivery_p_2189.html. Accessed May 21, 2020.

*Primary Examiner* — William H. Mayo, III
*Assistant Examiner* — Krystal Robinson
(74) *Attorney, Agent, or Firm* — Renner, Otto, Boisselle & Sklar, LLP

(57) ABSTRACT

A feedthrough device includes an outer shell having at least two separable parts and an inner sealing body that is retained within the outer shell when the separable parts are engaged with each other. The inner sealing body is configured to receive at least one wire therethrough.

17 Claims, 6 Drawing Sheets

(56) References Cited

U.S. PATENT DOCUMENTS

| | | | | |
|---|---|---|---|---|
| 3,423,518 A | * | 1/1969 | Weagant | H02G 3/0675 174/153 G |
| 3,448,430 A | * | 6/1969 | Kelly | H01R 9/05 439/607.52 |
| 3,548,079 A | * | 12/1970 | Wold | H02G 3/088 174/153 G |
| 3,603,912 A | * | 9/1971 | Kelly | H02G 3/0616 439/273 |
| 3,755,615 A | * | 8/1973 | Paullus | H01R 13/5205 174/76 |
| 3,803,531 A | * | 4/1974 | Sorensen | G21C 17/116 439/190 |
| 3,816,878 A | * | 6/1974 | Fulton | F16L 3/2334 24/16 PB |
| 3,828,118 A | * | 8/1974 | Bushek | H01B 17/30 174/11 R |
| 3,830,957 A | * | 8/1974 | Oberdiear | H02G 15/105 174/78 |
| 3,836,269 A | * | 9/1974 | Koscik | F16J 15/02 403/197 |
| 3,893,778 A | * | 7/1975 | Williams | F16L 58/00 403/344 |
| 3,913,187 A | * | 10/1975 | Okuda | F16L 3/12 24/484 |
| 3,963,299 A | * | 6/1976 | Thompson | H01R 4/2475 439/99 |
| 3,971,105 A | * | 7/1976 | Caveney | H02G 3/32 24/16 PB |
| 4,622,436 A | * | 11/1986 | Kinnan | H02G 15/04 174/23 R |
| 4,637,097 A | * | 1/1987 | Secord | F16B 7/0433 24/16 PB |
| 4,646,486 A | * | 3/1987 | Hauff | H02G 3/22 52/1 |
| 4,912,287 A | * | 3/1990 | Ono | H02G 3/083 174/153 G |
| 5,181,272 A | * | 1/1993 | Hopper | G02B 6/3887 385/139 |
| 5,213,290 A | * | 5/1993 | Moretti | F16L 5/027 174/153 G |
| 5,226,678 A | * | 7/1993 | Petranto | F16L 19/0231 285/334.5 |
| 5,406,032 A | * | 4/1995 | Clayton | H02G 3/083 174/151 |
| 5,545,854 A | * | 8/1996 | Ishida | H02G 3/081 16/2.2 |
| 5,605,358 A | * | 2/1997 | Mohlenkamp | F16L 19/025 285/39 |
| 5,964,013 A | * | 10/1999 | Bergstrom | B65D 63/1027 24/16 PB |
| 5,989,056 A | * | 11/1999 | Lange | H01R 4/2433 439/412 |
| 6,119,305 A | * | 9/2000 | Loveall | F16L 5/10 16/2.2 |
| 6,180,882 B1 | * | 1/2001 | Dinh | H02G 3/22 174/655 |
| 6,211,465 B1 | * | 4/2001 | Streit | H02G 3/0691 16/2.1 |
| 6,218,625 B1 | * | 4/2001 | Pulaski | B60R 16/0222 174/153 G |
| 6,305,975 B1 | * | 10/2001 | Steiner | H01R 13/5202 174/18 |
| 6,425,776 B1 | * | 7/2002 | Fredl | H01R 13/59 439/320 |
| RE38,294 E | * | 11/2003 | Nattel | H01R 9/03 174/59 |
| 6,960,108 B1 | * | 11/2005 | Jaszewski | F16L 3/23 174/152 G |
| 7,408,122 B2 | * | 8/2008 | Heimlicher | H02G 3/0658 16/2.1 |
| 9,000,310 B2 | * | 4/2015 | Smith | H02G 3/22 174/664 |
| 9,574,692 B2 | * | 2/2017 | Magno, Jr. | F16J 15/56 |
| 10,141,684 B2 | * | 11/2018 | Itzler | H01R 13/5205 |
| 10,385,906 B2 | * | 8/2019 | Huang | F16B 37/0821 |
| 10,422,134 B2 | * | 9/2019 | Lechuga | F16L 13/141 |
| 10,422,427 B2 | * | 9/2019 | Beele | F16L 5/10 |
| 10,461,443 B2 | * | 10/2019 | Smith | H01R 4/22 |
| 2003/0177612 A1 | * | 9/2003 | Hayes | B65D 63/00 24/16 R |
| 2008/0073118 A1 | * | 3/2008 | Drotleff | H02G 15/007 174/655 |
| 2013/0106060 A1 | * | 5/2013 | Beele | F16J 15/02 277/314 |
| 2013/0205545 A1 | * | 8/2013 | Zantout | B65D 63/1072 24/16 R |
| 2014/0182086 A1 | * | 7/2014 | Dorsey | H02G 3/32 24/16 R |
| 2015/0368928 A1 | * | 12/2015 | Ulrich | E05C 19/06 70/344 |
| 2017/0108147 A1 | * | 4/2017 | Cindrich | H02G 3/00 |
| 2018/0294633 A1 | * | 10/2018 | Kempeneers | H02G 15/013 |
| 2019/0326739 A1 | * | 10/2019 | Nowastowski-Stock | H02G 3/22 |

* cited by examiner

CONFIGURABLE PRESSURE BULKHEAD FEEDTHROUGH

FIELD OF THE INVENTION

The invention relates to feedthrough devices for wires, cables, or wire harnesses.

DESCRIPTION OF THE RELATED ART

Various applications have platforms requiring the passing of wires, cables, or wire harnesses from one region of the platform to another region. Platforms such as ships, aircrafts, space vehicles, and other moving platforms may have a barrier, or bulkhead, that is arranged between different compartments, such that the wiring must be passed through the bulkhead. In an exemplary application, a feedthrough device may be arranged to pass wiring between a pressurized interior of an aircraft and an unpressurized external part of the aircraft.

Conventional feedthrough devices include "stuffing tubes" through which the wiring passes. However, conventional feedthrough devices may be disadvantageous in that the voids of the tube are sealed by stuffing or filling the voids with a sealant that is applied around the wiring. Applying the sealant may be messy. Moreover, removing the sealant to add or remove wires may cause damage to other wires in the tube. Still another disadvantage is that wire harnesses generally have at least one harness assembly connector that is assembled on the vehicle. Previous attempts at providing sealed pressure feedthrough devices are deficient in both enabling reconfiguration of the seal to add or remove the harnesses and enabling the harness assembly to pass through the bulkhead orifice with the connectors being installed.

SUMMARY OF THE INVENTION

A reconfigurable feedthrough device having an outer shell and an inner sealing body may be used with wires, cables, or wire harnesses. The outer shell is advantageously formed of separable parts that are engageable and disengageable to enable reconfiguration of the feedthrough device, such that wires, cables, or wire harnesses may be easily added or removed. The inner sealing body is formed to have a plurality of wire-receiving through-apertures that receive a predetermined number and/or sizes of wires, cables, or wire harnesses. The feedthrough device is modular in that, in addition to enabling different configurations of wires within the inner sealing body, different inner sealing bodies may be configured to be supported by the outer shell. Thus, an inner sealing body may be selected for a particular application. The wire-receiving through-apertures may be sized to match the thickness of a wire or wire harness.

The inner boundary of the outer shell defines a groove which has a profile that matches the profile of the outer perimeter of the inner sealing body. When the separable parts are engaged against each other, the inner sealing body is supported and retained within the outer shell. Using the grooved inner boundary of the outer shell is advantageous in preventing axial movement of the inner sealing body, or the inner sealing body rubbing against the outer shell. Thus, wear of the inner sealing body is reduced.

Holding the separable parts of the outer shell together is achieved using an outer retainer, such as a band clamp or cable tie. The retainer is configured to surround the separable parts and may be adjustable to ensure both that the engagement between the separable parts is maintained and that the retainer may be removed for reconfiguration of the feedthrough device. Using the outer retainer is further advantageous for manufacturing the feedthrough device since the separable parts may be formed to be identical in shape and size.

The feedthrough device having the features described herein enables minimal or no additional sealant to be provided such that wires, cables, or wire harnesses may be more easily added or removed without disturbing the other components in the device. Any platform, such as a platform having a bulkhead separating a pressurized compartment from an unpressurized compartment, may be suitable for use with the feedthrough device. In an exemplary application in which an assembly of wire harnesses are connected together by a harness assembly connector that is installed, or assembled to the vehicle, the feedthrough device is further advantageous in enabling the harness assembly to pass through a bulkhead orifice with the connector installed on the platform.

According to an aspect of the invention, a feedthrough device for a bulkhead is reconfigurable.

According to an aspect of the invention, a feedthrough device for a bulkhead includes an outer shell have separable parts and an inner sealing body.

According to an aspect of the invention, a feedthrough device for a bulkhead includes an interchangeable inner sealing body that may be custom matched to a thickness of a cable, a wire, or a wire harness.

According to an aspect of the invention, a feedthrough device for a bulkhead uses minimal or no sealant.

According to an aspect of the invention, a feedthrough device enables a wire harness assembly to pass through a bulkhead orifice with wire harness connectors being assembled to a platform.

According to an aspect of the invention, a feedthrough device includes an outer shell having at least two separable parts, and an inner sealing body that is retained within the outer shell when the separable parts are engaged with each other, the inner sealing body being configured to receive at least one wire therethrough.

According to an embodiment of any paragraph(s) of this summary, the outer shell has an inner boundary groove that is complementary in shape to an outer perimeter of the inner sealing body for receiving the inner sealing body.

According to an embodiment of any paragraph(s) of this summary, the separable parts are radially engageable and each of the separable parts has a radially extending body and at least one axially extending flange.

According to an embodiment of any paragraph(s) of this summary, the feedthrough device includes a retainer that is arranged around the axially extending flange of each of the separable parts to hold the separable parts together.

According to an embodiment of any paragraph(s) of this summary, the axially extending flange has a knurled surface that receives the retainer.

According to an embodiment of any paragraph(s) of this summary, the retainer is a band clamp or a cable tie.

According to an embodiment of any paragraph(s) of this summary, the at least one axially extending flange includes a first axially extending flange extending from one side of the radially extending body, and a second axially extending flange that extends from an opposite side of the radially extending body.

According to an embodiment of any paragraph(s) of this summary, the outer shell and the inner sealing body are cylindrical in shape.

According to an embodiment of any paragraph(s) of this summary, the radially extending body has an inner radius that is greater than an inner radius of the at least one axially extending flange.

According to an embodiment of any paragraph(s) of this summary, the radially extending body has an outer radius that is greater than an outer radius of the at least one axially extending flange.

According to an embodiment of any paragraph(s) of this summary, the separable parts are identical in shape.

According to an embodiment of any paragraph(s) of this summary, the inner sealing body is formed of a rubber material.

According to an embodiment of any paragraph(s) of this summary, the inner sealing body defines a plurality of wire-receiving through-apertures.

According to embodiment of any paragraph(s) of this summary, the plurality of wire-receiving through-apertures are uniformly spaced about the inner sealing body.

According to another aspect of the invention, a method of assembling a feedthrough device for a plurality of wires includes forming an outer shell having at least two separable parts, forming an inner sealing body having a plurality of wire-receiving through-apertures, inserting the plurality of wires through the inner sealing body, and engaging the separable parts around the inner sealing body to retain the inner sealing body.

According to embodiment of any paragraph(s) of this summary, the method includes using an additive manufacturing process to form the outer shell.

According to embodiment of any paragraph(s) of this summary, the method includes selecting the inner sealing body from a plurality of different inner sealing bodies.

According to embodiment of any paragraph(s) of this summary, the method includes arranging a retainer around the separable parts to hold the separable parts together around the inner sealing body.

According to embodiment of any paragraph(s) of this summary, the method includes forming a knurled axially extending flange on each of the two separable parts for engagement by the retainer.

According to embodiment of any paragraph(s) of this summary, the method includes disengaging the separable parts from each other, adding or removing a wire through the wire-receiving through-apertures in the inner sealing body, and re-engaging the separable parts together.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

The principles described herein have particular application in platforms having wiring, e.g. wires, cables, or wire harnesses, to be passed from one region or compartment of the platform to another region or compartment. Exemplary platforms include ships, aircrafts, space vehicles, and other moving platforms that may have a barrier, or bulkhead, that is arranged between different compartments. In exemplary applications, the feedthrough device may be arranged to pass wiring between a pressurized interior to an unpressurized area, such that the feedthrough device is particularly suitable for sealing in pressure-type applications. The feedthrough device may also be configured for use in an engine compartment. Non-moving platform applications may also be suitable. For example, a stationary building having a panel box or breaker box having wires, cables, or wire harnesses may be suitable for use with the feedthrough. Many other applications may be suitable.

Figure 1:
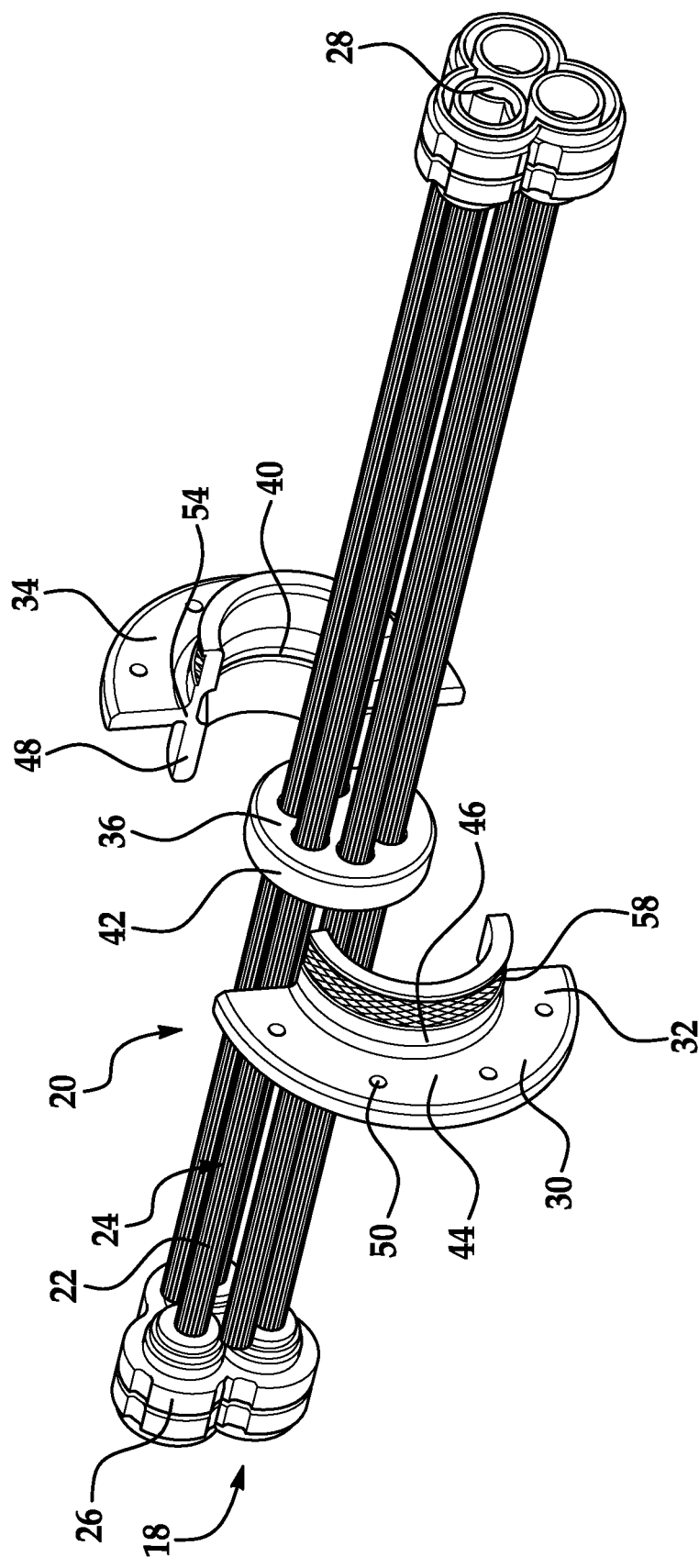
FIG. 1 shows an exploded oblique view of a bulkhead feedthrough assembly according to an embodiment of the invention.
Figure 2:
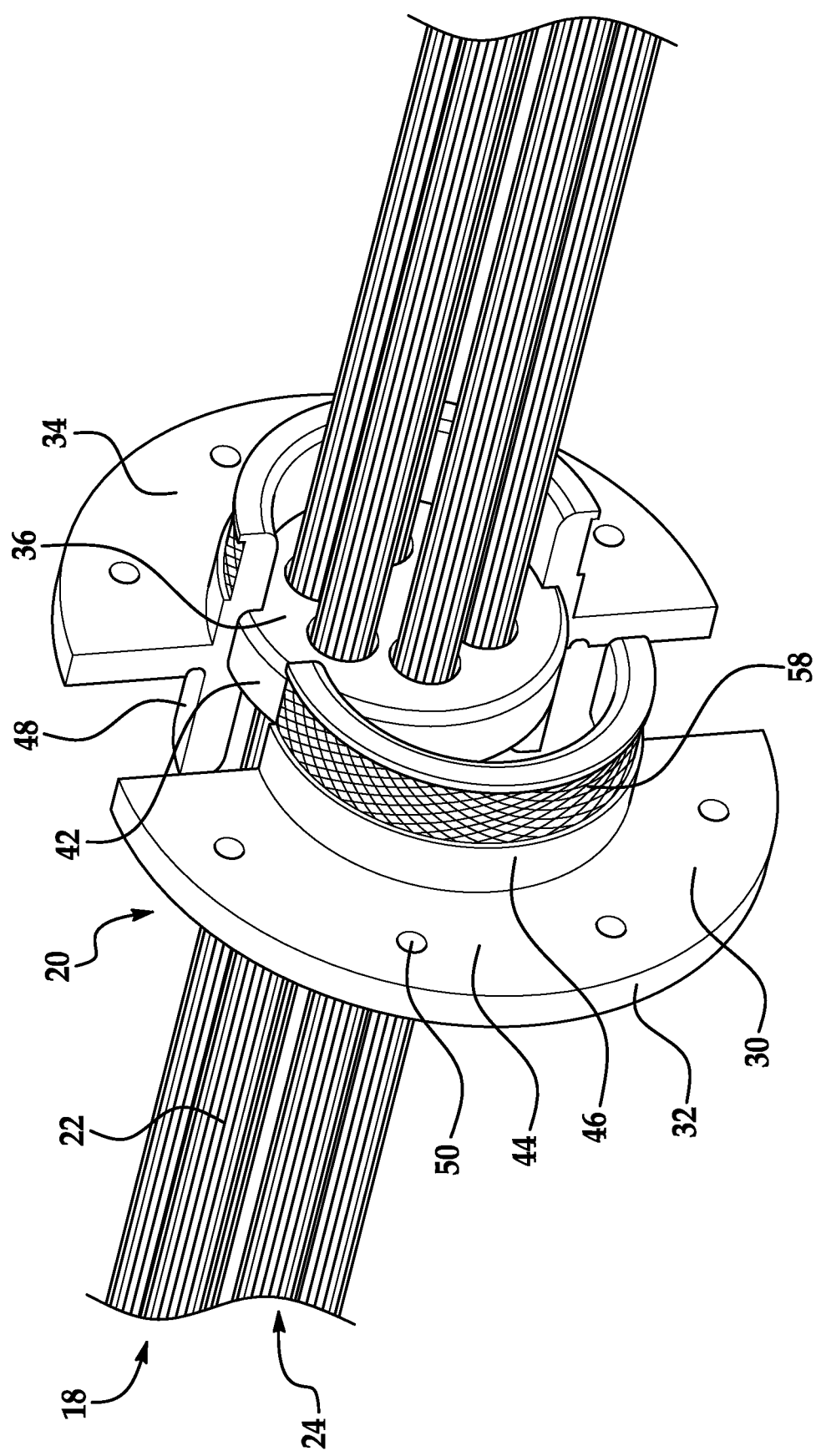
FIG. 2 shows a detailed view of a feedthrough device of the bulkhead feedthrough assembly of FIG. 1.

FIGS. 1 and 2 show a bulkhead feedthrough assembly 18 having a feedthrough device 20 for at least one wire harness 22 that is formed of a plurality of wires or cables. The bulkhead feedthrough assembly 18 may include a wire harness assembly 24, or a plurality of wire harnesses that are connected with each other through at least one harness assembly connector 26, 28 arranged at the end of the wire harness assembly. A harness assembly connector may be arranged at both ends of the wire harness assembly 24 such that the wire harness assembly 24 extends between the harness assembly connectors 26, 28. At least one of the harness assembly connectors 26, 28 may be assembled to the vehicle.

With further reference to FIGS. 3-6, the feedthrough device 20 includes an outer shell 30 that is formed of at least two separable parts 32, 34 that are engageable with each other when the feedthrough device 20 is assembled and in use, and disengageable with each other to enable reconfiguring of the feedthrough device 20. Reconfiguring of the feedthrough device 20 may include adding or removing a wire harness 22. The outer shell 30 is arranged around a longitudinal axis or central axis of the bulkhead feedthrough assembly 18. The central axis of the bulkhead feedthrough assembly 18 is defined by an axis with which each wire harness 24 is parallel. Each wire harness 24 is arranged about the central axis. The outer shell 30 is configured to surround an axial portion of the wire harness assembly 24. As shown, two separable parts 32, 34 may be provided but in other exemplary embodiments, more than two separable parts 32, 34 may be provided to form the outer shell 30.

Figure 3:
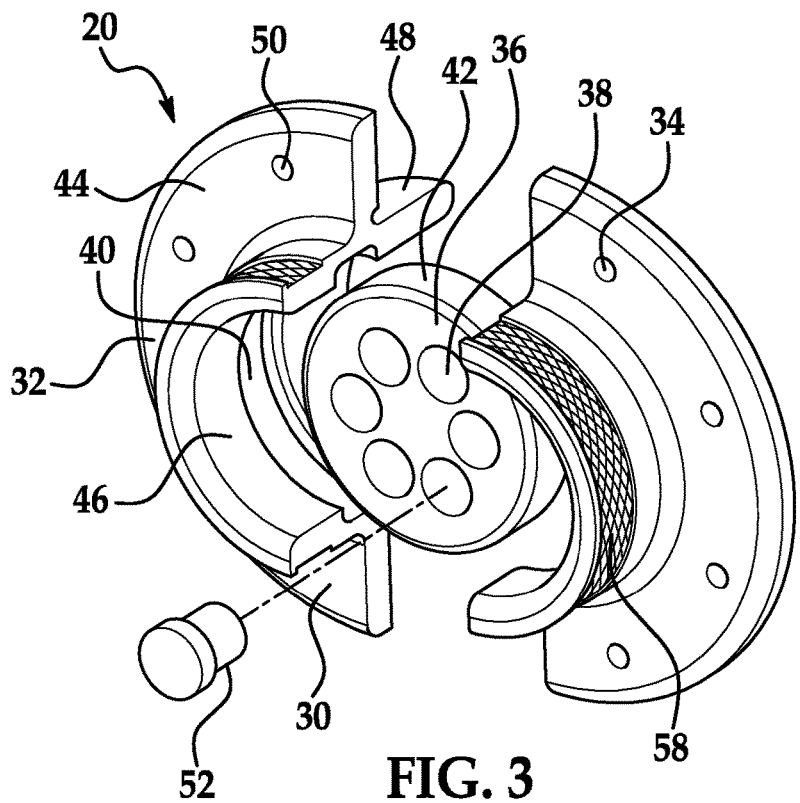
FIG. 3 shows a front oblique view of the feedthrough device of FIG. 2 having an outer shell with separable parts that are disengaged from each other.
Figure 4:
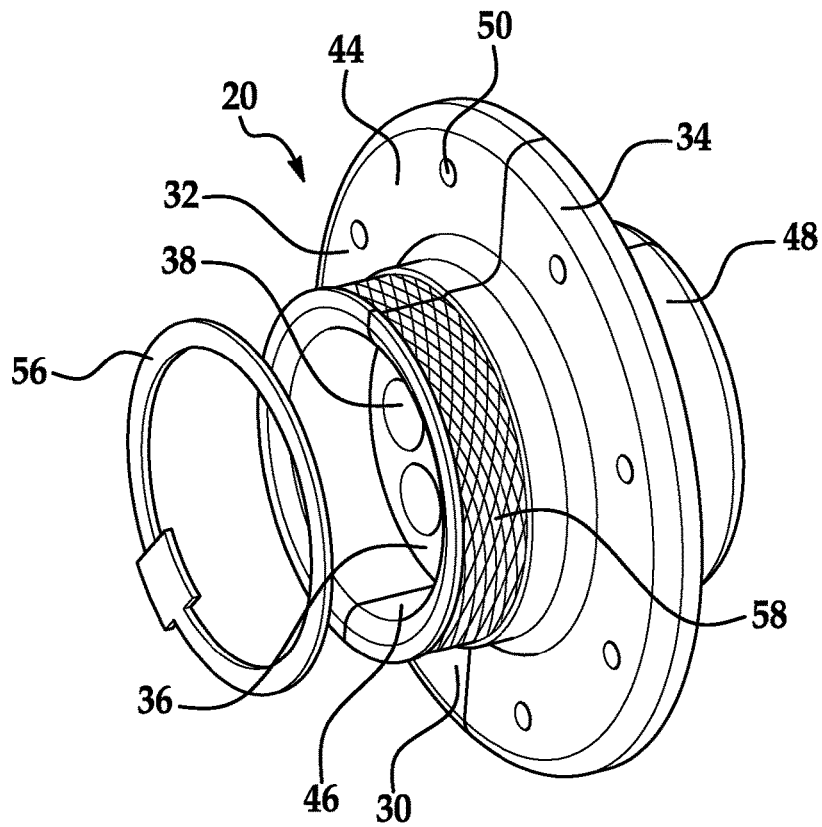
FIG. 4 shows a side oblique view of the feedthrough device of FIG. 3 having the separable parts being engaged with each other.
Figure 5:
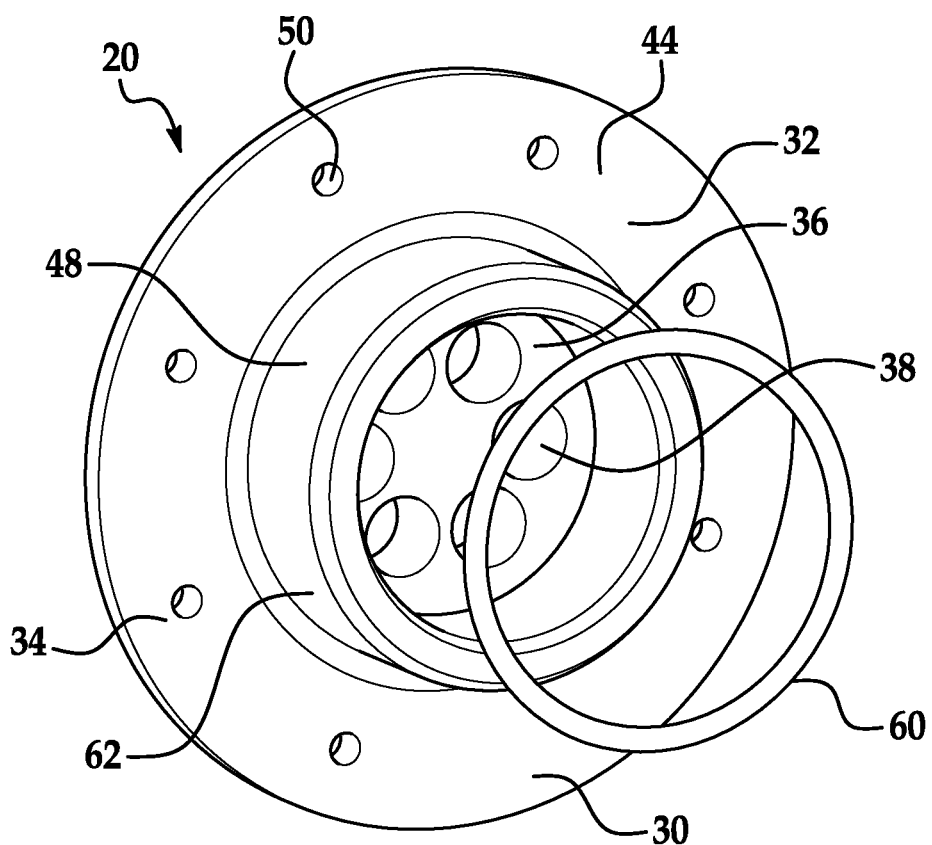
FIG. 5 shows a rear oblique view of the feedthrough device of FIG. 3 having the separable parts being engaged with each other.

The feedthrough device 20 further includes an inner sealing body 36 that is supported and retained within the outer shell 30 when the separable parts 32, 34 are engaged with each other. The inner sealing body 36 may be formed of any suitable sealing material and the material may be dependent on the application. The material may be dependent on the temperature of the environment in which the feedthrough device 20 is arranged. Any elastomeric or flexible material may be suitable, such as rubber. A flame-retardant rubberized compound material may be suitable for particular applications. The inner sealing body 36 is configured to receive at least one wire harness 22 through the inner sealing body 36 and may be formed to support a predetermined number of wire harnesses. At least one wire-receiving through-aperture 38 is formed in the inner sealing body 36, as best shown in FIGS. 3-5. The wire-receiving through-aperture 38 may be sized to match a thickness of the wire harness 22, or in other exemplary applications, the thickness of a wire.

Figure 6:
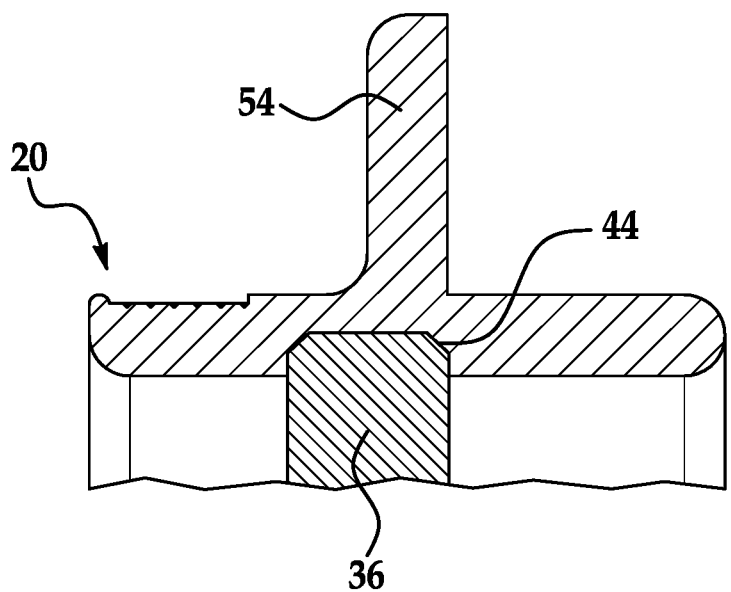
FIG. 6 shows a sectional view of a part of the feedthrough device of FIG. 3.

The inner sealing body 36 is also arranged around the central axis of the wire harness assembly 24 and surrounds an axial portion of the wire harness assembly 24. The inner sealing body 36 is surrounded by the outer shell 30 such that the inner sealing body 36 is radially interposed between the wire harness assembly 24 and the outer shell 30. Each of the two separable parts 32, 34 has an inner boundary groove 40 that is complementary in shape to an outer perimeter 42 of the inner sealing body 36, as best shown in FIGS. 1, 3 and 6. The inner boundary groove 40 is advantageous in preventing movement of the inner sealing body 36, such as rubbing or chafing of the inner sealing body 36 against the outer shell 30 that would cause wear on the inner sealing body 36. As best shown in FIG. 6, the inner boundary groove 40 may have a further retaining feature 40a formed within the inner boundary groove 40. For example, the retaining feature 40a may be formed as a beveled edge that is complementary in shape to a corresponding beveled edge of the inner sealing body 36. The retaining feature 40a may be formed to have any suitable shape that matches a shape of the outer perimeter 42 of the inner sealing body 36.

The separable parts 32, 34 are radially engageable with each other such that the separable parts 32, 34 are radially movable relative to the central axis of the wire harness assembly 24 and the inner sealing body 36. Providing the separable parts 32, 34 is advantageous in enabling the assembled harness assembly 24 to be installed through a pressure bulkhead using minimal or no additional sealant, as compared with the conventional feedthrough devices. The feedthrough device 20 also enables the harness assembly 24 to be installed through a bulkhead orifice when both harness assembly connectors 26, 28 are assembled to the vehicle, in contrast to conventional feedthrough devices. Using the outer shell 30 with the separable parts 32, 34 enables a less complex reconfiguration of the feedthrough device 20 if a wire, cable, or harness is to be added or removed from the wire harness assembly 24, without causing damage to the other components in the bulkhead feedthrough assembly 18.

The outer shell 30 and the inner sealing body 36 are shown as being cylindrical in shape, but any shape may be suitable and the shape may be dependent on the application or the platform in which the feedthrough device 20 is arranged. The shape may be dependent on the shape of an aperture in which the feedthrough device 20 is to be mounted. In exemplary applications, the outer shell 30 and the inner sealing body 36 may be rectangular, pentagonal, or hexagonal in shape, or have any other polygonal-type shape. The shape of the separable parts 32, 34 may be symmetrical or regular, or the shapes may be irregular. In an exemplary embodiment in which the outer shell 30 and the inner sealing body 36 are cylindrical in shape, each of the two separable parts 32, 34 are formed as hemi-cylindrical halves and the inner sealing body 36 is formed as a disk-type or puck-type solid body that is concentrically supported within the separable parts 32, 34 when the separable parts 32, 34 are engaged together. In an exemplary embodiment in which more than one separable part 32, 34 is provided, each separable part may be semi-cylindrical in shape.

Each of the two separable parts 32, 34 may have a radially extending body 44 and at least one axially extending flange 46, 48 that extends axially outwardly from the radially extending body 44. A first axially extending flange 46 may be arranged on one side, or a front side, of the radially extending body 44 and a second axially extending flange 48 may be arranged on an opposite side, or a bulkhead side of the radially extending body 44. The radially extending body 44 may be plate-like in shape and an outer radius of the radially extending body 44 may be greater than an outer radius of the axially extending flanges 46, 48. The outer shell 30 may be formed of any suitable material, such as a metal material, and may be formed of any suitable manufacturing process. Aluminum may be a suitable material and the material may be dependent on the application. Additive manufacturing, conventional manufacturing processes, and combinations thereof may be suitable. For example, 3D printing, machining, and combinations thereof may be suitable. The radially extending body 44 may be formed to have at least one mounting hole 50, or a plurality of mounting holes for mounting the feedthrough device 20 to the platform. The mounting holes may be equidistantly spaced about the radially extending body 44 and configured to receive any suitable mounting hardware. Examples of suitable hardware include rivets and screws.

The separable parts 32, 34 may be formed to be identical in shape and size, which is advantageous in manufacturing the components as compared with using non-similar components that would require a more complex manufacturing and assembly process. Each separable part 32, 34 may be formed as a continuous body such that the radially extending body 44 and the axially extending flanges 46, 48 are formed integrally with each other. In other exemplary applications, the components may be formed separately and attached to each other using any suitable joining process, such as welding. The axial length of each of the first axially extending flange 46 and the second axially extending flange 48 may be greater than an axial length of the radially extending body 44, and the axial lengths of the axially extending flanges 46, 48 may be similar to each other. The inner boundary groove 40 of each of the separable parts 32, 34 is formed on the radially extending body 44 and may be an annular groove that extends along the entire inner boundary of the corresponding radially extending body 44. The radius of the inner boundary groove 40 is greater than the inner radius of the axially extending flanges 46, 48 such that the inner sealing body 36 is axially interposed between the axially extending flanges 46, 48.

The feedthrough device 20 may have any suitable dimensions and the dimensions may be dependent on the application. In an exemplary application, the outer diameter of the feedthrough device 20 may be between 30 and 46 centimeters (between 12 and 18 inches), with the outer diameter of the inner sealing body 36 being approximately half of the size of the outer diameter. The dimensions are merely exemplary and the feedthrough device 20 may be sized up or down depending on the application. The outer diameter of the feedthrough device 20 may have an axial curvature or be rounded, such as in FIGS. 1, 3 and 4. In other exemplary embodiments, the outer diameter of the feedthrough device 20 may have a straight axial length that defines a sharp perimeter edge of the radially extending body 44, such as in FIG. 2. The inner sealing body 36 may be sized to support any size of wires, cables, or wire harnesses and the inner sealing body 36. In exemplary embodiments, wires or wire harnesses having gauges between 22 and 30 may be suitable. Many other dimensions may be suitable and many different sizes of wires, cables, or wire harnesses are suitable for use with the feedthrough device 20.

As shown, the inner sealing body 36 may have six wire-receiving through-apertures, but more or fewer wire-receiving through-apertures may be formed in the inner sealing body 36. The wire-receiving through-apertures are circular in shape, but may have any suitable shape dependent on the configuration of the wires. Each wire-receiving through-aperture 38 may be configured to support a single wire or wire harness 24 such that wire harnesses may be added to or removed from the inner sealing body 36. Using the inner sealing body 36 is advantageous in that the inner sealing body 36 may be removable or replaceable relative to the outer shell 30. The feedthrough device 20 is modular in that different sealing bodies may be used, and the inner sealing body 36 that is selected for use in the feedthrough device 20 may be dependent on the application and the thickness of a wire or the wire harness 22, or the number of wire harnesses. Using the separable parts 32, 34 advantageously enables the modularity of the feedthrough device 20. The inner sealing body 36 is thus able to be custom matched to a particular number or size of the wires, cables, or wire harnesses. In an exemplary embodiment, as schematically shown in FIG. 3, unused wire-receiving through-apertures may be sealed or plugged using any suitable sealant or sealing structure, such as a sealing plug 52.

When the feedthrough device 20 is assembled and the inner sealing body 36 is retained within the outer shell 30, the separable parts 32, 34 are engageable with each other and secured together. Each of the separable parts 32, 34 has an engaging surface 54 that extends radially between the inner boundary groove 40 and the outer diameter of the radially extending body 44, and extends axially between axial ends of the corresponding separable part 32, 34. The engaging surface 54 extends from a distal axial end of one of the axially extending flanges 46, 48 to the opposite axial end of the other of the axially extending flanges 46, 48. Accordingly, the engaging surface 54 is substantially T-shaped. The separable parts 32, 34 contact each other by engaging the engaging surface 54 of the opposing separable part 32, 34 in a radial direction. Each engaging surface 54 is planar in shape such that the engaging surfaces are flush with each other when in engagement.

FIGS. 4 and 5 show the separable parts 32, 34 being in engagement with each other. As shown in FIG. 4, the feedthrough device 20 further includes a retainer 56 for holding the separable parts 32, 34 in engagement. In the exemplary embodiment in which the feedthrough device 20 is cylindrical in shape, the retainer 56 is annular in shape, or ring-shaped such that the retainer 56 may be arranged around the first axially extending flange 46 of each of the separable parts 32, 34. The retainer 56 may be continuous around both of the separable parts 32, 34 to ensure engagement of the separable parts 32, 34. Any suitable retainer 56 may be used and the retainer 56 is formed of any suitable material, which may be dependent on the application. Examples of suitable retainers include a band clamp or a cable tie. An exemplary band clamp may be formed of a metal material. The retainer 56 may be adjustable in length such that the retainer 56 may be tightened to maintain engagement between the separable parts 32, 34, or loosened to remove the retainer 56 from the separable parts 32, 34 and enable disengagement of the separable parts 32, 34 for adjusting or reconfiguring the wire harnesses.

Each first axially extending flange 46 may be configured to ensure retainment of the retainer 56 on the first axially extending flange 46. The first axially extending flange 46 may have a ridged or knurled surface 58 that receives the retainer 56 and increases the surface friction between the first axially extending flange 46 and the retainer 56 to prevent displacement of the retainer 56. The knurled surface 58 is formed on an outer surface of the first axially extending flange 46 and may extend along the entire surface. Any pattern of ridges may be suitable for the knurled surface 58 and the pattern may be formed using any sort of manufacturing process, such as milling.

As shown in FIG. 5, the second axially extending flange 48 is arranged on an opposite side of the feedthrough device 20, which may be the bulkhead side of the feedthrough device 20, relative to the first axially extending flange 46 and the retainer 56. The second axially extending flange 48 may be formed to support an additional sealing mechanism. For example, an o-ring 60 or any other suitable sealing element may be arranged on an outer surface 62 of the second axially extending flange 48. Additional sealant may also be provided in the feedthrough device 20 after assembly. Using the separable part outer shell and the inner sealing body in the feedthrough device 20 is advantageous in that any additional sealant provided in the feedthrough device 20 may be minimal. In exemplary embodiments, no additional sealant may be used.

Figure 7:
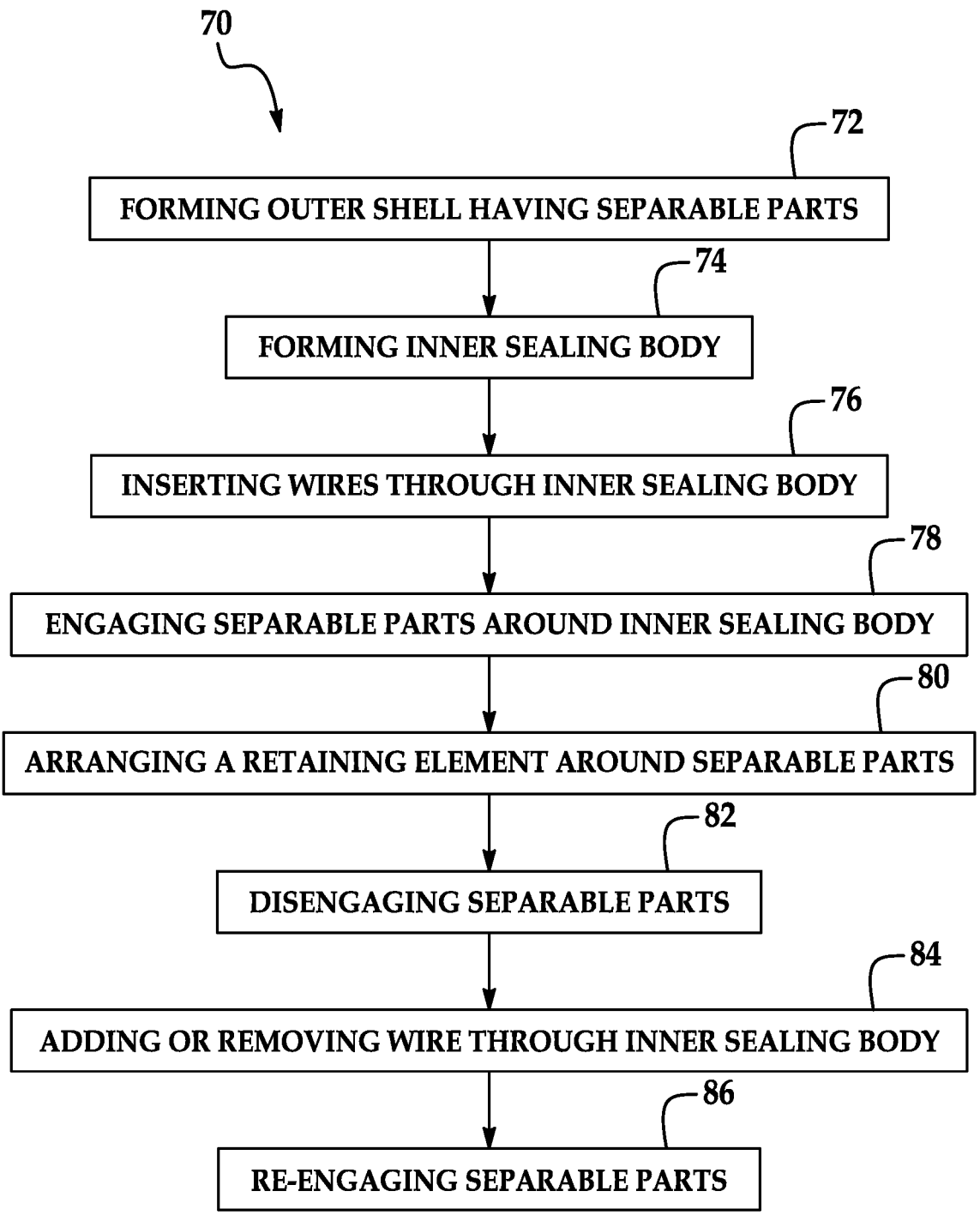
FIG. 7 shows a flow chart illustrating a method of assembling a bulkhead feedthrough assembly.

Referring now to FIG. 7, a flow chart illustrating a method 70 of assembling a feedthrough device 20 (shown in FIGS. 1-6) for a plurality of wires, such as a wire harness assembly 24 (shown in FIGS. 1 and 2), is shown. Step 72 of the assembly method 70 includes forming an outer shell 30 having at least two separable parts 32, 34 (shown in FIGS. 1-6). More than two separable parts 32 may be formed. The separable parts 32 may be formed by any suitable additive manufacturing process, such as 3D printing. Forming the two separable parts 32 may include forming the two separable parts 32 to be identical in shape and size and forming a knurled axially extending flange 46 (shown in FIGS. 1-4) on each of the two separable parts 32, 34. The outer shell 30 may be formed to have any suitable shape and size which are dependent on the application.

Step 74 of the method 70 includes forming the inner sealing body 36 (shown in FIGS. 1-6). Forming the inner sealing body 36 includes forming the inner sealing body 36 to have a plurality of wire-receiving through-apertures and forming the inner sealing body 36 of any suitable sealing material, such as rubber. The number of wire-receiving through-apertures may be dependent on the application. Step 74 further includes selecting the inner sealing body 36 from a plurality of different inner sealing bodies that may be configured to support a different number and/or sized wire harnesses. Step 76 of the method 70 includes inserting a wire harness 22 or a wire harness assembly 24 (shown in FIGS. 1 and 2) through the inner sealing body 36.

Step 78 of the method 70 includes engaging the separable parts 32, 34 around the inner sealing body 36 to support and retain the inner sealing body 36. The separable parts 32, 34 have an inner boundary groove in which the inner sealing body 36 is received. After the separable parts 32, 34 are engaged with each other, step 80 of the method 70 includes arranging a retainer 56 (shown in FIG. 4) around the separable parts 32, 34 to hold the separable parts 32, 34 together around the inner sealing body 36. In an exemplary application in which the feedthrough device 20 is to be reconfigured to add or remove wires, step 82 includes disengaging the separable parts 32, 34 from each other. The separable parts 32, 34 may be manually disengaged from each other, or in exemplary embodiments, the disengaging may be performed by an automated system. The retainer 56 may be a cable tie or band clamp that is easily removable from the separable parts 32, 34 to enable disengagement of the separable parts 32, 34.

After the separable parts 32, 34 are disengaged from each other, step 84 of the method 70 includes adding or removing a wire or a wire harness through the wire-receiving through-apertures in the inner sealing body 36. The wires or wire harnesses may be manually added or removed, or in exemplary embodiments, an automated system may be configured to for reconfiguring the wires. Any unused wire-receiving through-aperture may be sealed or plugged. Step 84 may further include removing or replacing the inner sealing body 36. After the feedthrough device 20 is reconfigured, step 86 of the method 70 includes re-engaging the separable parts 32, 34 to support the inner sealing body 36. In addition to enabling a less complex reconfiguration of a wire harness assembly, the feedthrough device 20 also enables the wire harness assembly 24 to be installed through a bulkhead orifice, such as in an aircraft, with the wire harness connectors 26, 28 (shown in FIG. 1) being assembled to the aircraft body.

Figure 8:
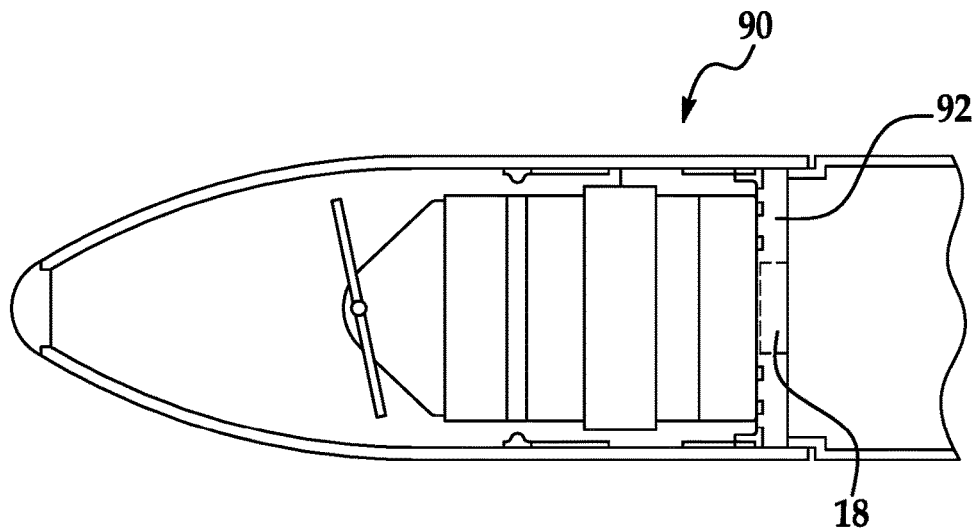
FIG. 8 shows an exemplary application in which the bulkhead feedthrough assembly of FIG. 1 is arranged in an aircraft.
Figure 9:
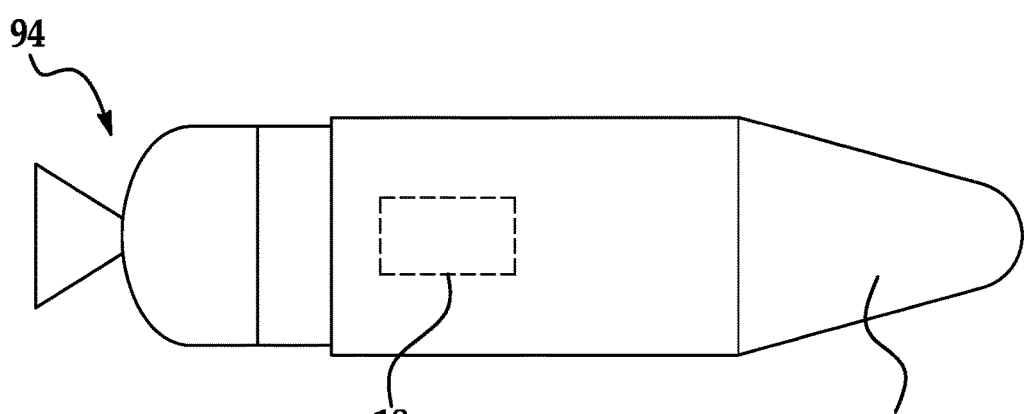
FIG. 9 shows an exemplary application in which the bulkhead feedthrough assembly of FIG. 1 is arranged in a space vehicle.
Figure 10:
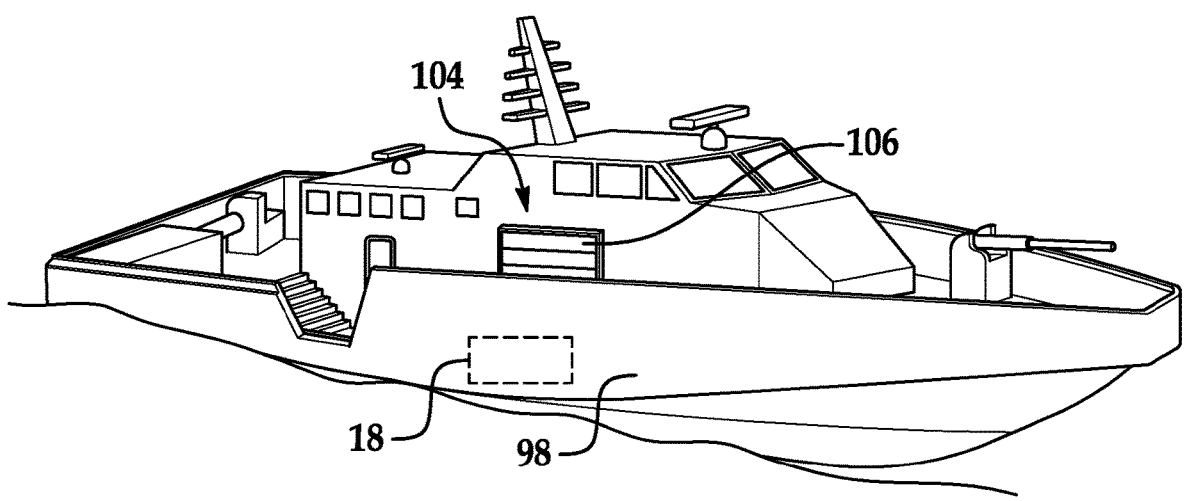
FIG. 10 shows an exemplary application in which the bulkhead feedthrough assembly of FIG. 1 is arranged in a sea vessel.

FIGS. 8-10 show exemplary applications or platforms in which the bulkhead feedthrough assembly 18 (shown in FIGS. 1 and 2) may be used. The platforms shown may be used in commercial applications, other non-lethal applications, or military applications. FIG. 8 shows an exemplary aircraft 90 having a bulkhead 92 in which the feedthrough assembly 18 is arranged. The bulkhead 92 may be arranged between a pressurized area of the aircraft 90 and an unpressurized area of the aircraft 90. FIG. 9 shows a hypersonic or supersonic vehicle 94 that may include feedthrough assembly 18. The feedthrough assembly 18 may be configured to pass wiring from the pressurized interior of the vehicle 94 to a radome 96 of the hypersonic vehicle 94. FIG. 10 shows a naval vessel 98 which may include the feedthrough assembly 18 in a lower part of the naval vessel 98.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A feedthrough device comprising:
   an outer shell having at least two same separable parts that are independent relative to each other;
   an inner sealing body that is retained within the outer shell when the separable parts are engaged with each other, the inner sealing body being configured to receive at least one wire therethrough, wherein each of the separable parts includes at least one axially extending flange, and
   a retainer that is arranged around the at least one axially extending flange of each of the separable parts to hold the separable parts together,
   wherein the at least one axially extending flange has a knurled surface that receives the retainer.

2. The feedthrough device according to claim 1, wherein the outer shell has an inner boundary groove that is complementary in shape to an outer perimeter of the inner sealing body for receiving the inner sealing body.

3. The feedthrough device according to claim 1, wherein the separable parts are radially engageable and each of the separable parts has a radially extending body.

4. The feedthrough device according to claim 3, wherein the at least one axially extending flange includes a first axially extending flange extending from one side of the radially extending body, and a second axially extending flange that extends from an opposite side of the radially extending body.

5. The feedthrough device according to claim 3, wherein the outer shell and the inner sealing body are cylindrical in shape.

6. The feedthrough device according to claim 5, wherein the radially extending body has an inner radius that is greater than an inner radius of the at least one axially extending flange.

7. The feedthrough device according to claim 6, wherein the radially extending body has an outer radius that is greater than an outer radius of the at least one axially extending flange.

8. The feedthrough device according to claim 1, wherein the retainer is a band clamp or a cable tie.

9. The feedthrough device according to claim 1, wherein the separable parts are identical in shape.

10. The feedthrough device according to claim 1, wherein the inner sealing body is formed of a rubber material.

11. The feedthrough device according to claim 1, wherein the inner sealing body defines a plurality of wire-receiving through-apertures.

12. The feedthrough device according to claim 11, wherein the plurality of wire-receiving through-apertures are uniformly spaced about the inner sealing body.

13. A method of assembling a feedthrough device for at least one wire, the method comprising:
   using an additive manufacturing process to form an outer shell having at least two same separable parts that are independent relative to each other;
   forming an inner sealing body having one or more wire-receiving through-apertures;
   inserting the at least one wire through the inner sealing body; and engaging the separable parts around the inner sealing body to retain the inner sealing body.

14. The method according to claim 13 further comprising selecting the inner sealing body from a plurality of different inner sealing bodies.

15. The method according to claim 13 further comprising arranging a retainer around the separable parts to hold the separable parts together around the inner sealing body.

16. A method of assembling a feedthrough device for a plurality of wires, the method comprising:
   forming an outer shell having at least two separable parts;
   forming an inner sealing body having a plurality of wire-receiving through-apertures;
   inserting the plurality of wires through the inner sealing body; and
   engaging the separable parts around the inner sealing body to retain the inner sealing body;
   arranging a retainer around the separable parts to hold the separable parts together around the inner sealing body; and
   forming a knurled axially extending flange on each of the two separable parts for engagement by the retainer.

17. The method according to claim 13 further comprising:
   disengaging the separable parts from each other;
   adding or removing a wire through the one or more wire-receiving through-apertures in the inner sealing body; and
   re-engaging the separable parts together.

\* \* \* \* \*